US012523540B2

(12) United States Patent
Munsch et al.

(10) Patent No.: US 12,523,540 B2
(45) Date of Patent: Jan. 13, 2026

(54) NANOSCALE THERMOMETRY

(71) Applicants: Qnami AG, Muttenz (CH); CENTRE NATIONAL DE LA RECHERCHE SCIENTIFIQUE (CNRS), Paris (FR); UNIVERSITÉ DE MONTPELLIER, Montpellier (FR)

(72) Inventors: Mathieu Munsch, Eschentzwiller (FR); Patrick Maletinsky, Zürich (CH); Felipe Favaro de Oliveira, Muttenz (CH); Rana Tanos, Koura (LB); Vincent Jacques, Montpellier (FR); Isabelle Robert-Philip, Castelnau-le-Lez (FR)

(73) Assignees: Qnami AG, Muttenz (CH); CENTRE NATIONAL DE LA RECHERCHE SCIENTIFIQUE (CNRS), Paris (FR); UNIVERSITÉ DE MONTPELLIER, Montpellier (FR)

( * ) Notice: Subject to any disclaimer, the term of this patent is extended or adjusted under 35 U.S.C. 154(b) by 461 days.

(21) Appl. No.: 18/040,194

(22) PCT Filed: Jun. 29, 2021

(86) PCT No.: PCT/IB2021/055791
§ 371 (c)(1),
(2) Date: Feb. 1, 2023

(87) PCT Pub. No.: WO2022/029522
PCT Pub. Date: Feb. 10, 2022

(65) Prior Publication Data
US 2023/0266174 A1    Aug. 24, 2023

(30) Foreign Application Priority Data
Aug. 6, 2020   (EP) .................................... 20189935

(51) Int. Cl.
*G01K 1/14*       (2021.01)
*G01K 11/12*     (2021.01)
(Continued)

(52) U.S. Cl.
CPC ................. *G01K 1/14* (2013.01); *G01K 11/12* (2013.01); *G01K 11/20* (2013.01); *G01N 27/283* (2013.01); *G01K 2211/00* (2013.01)

(58) Field of Classification Search
CPC .......... G01K 1/14; G01K 11/12; G01K 11/20; G01K 2211/00; G01K 1/02; G01N 27/283; G01N 27/28
See application file for complete search history.

(56) References Cited

U.S. PATENT DOCUMENTS

RE36,285 E  *  8/1999  Stansfeld ............... G01K 13/02
                                                                    73/866.5
8,739,620 B1 *  6/2014  Haberbusch ............ G01F 23/00
                                                                    73/290 R
(Continued)

FOREIGN PATENT DOCUMENTS

AU     2002254423 A1 *  5/2003
EP        1739399 B1 *  9/2015 ........... G01K 17/006
(Continued)

OTHER PUBLICATIONS

First Notice of Rejection issued in corresponding Japanese Patent Application No. 2022-577613; Mailing Date: Feb. 7, 2024.
(Continued)

*Primary Examiner* — Laura Martin
*Assistant Examiner* — Julia Fitzpatrick
(74) *Attorney, Agent, or Firm* — McDonald Hopkins LLC

(57) ABSTRACT

A nanoscale temperature detector including a diamond sensing probe with a transverse dimension of at least 200 nanometres and a sensing tip-having a curvature radius of
(Continued)

less than 100 nanometres, less than 10 nanometres or less than 1 nanometre, and a plurality of colour centres, whose emission count rate show temperature-sensitive features. The diamond sensing probe has a transverse dimension of at least 200 nanometres and is connected to a to a detector system by means of a mounting structure. A thermal isolation barrier thermally decouples the sensing probe from the detector system.

19 Claims, 4 Drawing Sheets

(51) Int. Cl.
  *G01K 11/20* (2006.01)
  *G01N 27/28* (2006.01)

(56) References Cited

U.S. PATENT DOCUMENTS

| | | | | |
|---|---|---|---|---|
| 10,564,044 B2* | 2/2020 | Bradley | ............. | G01J 5/0011 |
| 2002/0136263 A1* | 9/2002 | Wilkins | ............. | G01K 1/14 |
| | | | | 374/185 |
| 2004/0161017 A1* | 8/2004 | Chang | ............. | G01K 1/18 |
| | | | | 374/E13.002 |
| 2005/0038172 A1* | 2/2005 | Nimberger | ............. | G01K 13/02 |
| | | | | 524/495 |
| 2016/0018269 A1 | 1/2016 | Maurer et al. | | |

FOREIGN PATENT DOCUMENTS

| | | | | |
|---|---|---|---|---|
| EP | 3376245 A1 | | 9/2018 | |
| GB | 2469745 A | * | 10/2010 | ........... G01K 11/165 |
| JP | 2013140019 A | * | 7/2013 | |
| JP | 2017067650 A | | 4/2017 | |
| JP | 2017075964 A | | 4/2017 | |
| KR | 20010006600 A | * | 1/2001 | ............. G01K 1/143 |
| WO | WO-9844322 A1 | * | 10/1998 | ............. G01K 13/00 |
| WO | WO-03002965 A1 | * | 1/2003 | ............... G01K 7/42 |
| WO | 2014051886 A1 | | 4/2014 | |
| WO | WO-2015128655 A1 | * | 9/2015 | ........... G01K 11/165 |
| WO | WO-2019183353 A1 | * | 9/2019 | ............... G01K 1/14 |

OTHER PUBLICATIONS

International Search Report for PCT/IB2021/055791 dated Oct. 5, 2021.
Written Opinion for PCT/IB2021/055791 dated Oct. 5, 2021.
Search Report issued in European Patent Application No. 20189935 dated Jan. 14, 2021.

* cited by examiner

NANOSCALE THERMOMETRY

TECHNICAL DOMAIN

The present invention concerns high spatial resolution thermometry.

RELATED ART

High spatial resolution thermometry, and nanoscale thermometry in particular, finds its application in numerous technical fields, including, amongst others, in microelectronics, in heat-assisted magnetic recording, in material science, where it is particularly relevant for thermoelectric materials, thermal interfaces and diodes, furthermore in nanophotonics, including thermophotovoltaics, photonic devices, thermoplasmonics, and in biology to determine thermogenesis, hyperthermia, or detect hypermetabolic activity.

Today, the most commonly used technologies to measure temperatures at nanoscale resolution are (i) scanning thermal microscopy (SThM) with a typical spatial resolution of 10-500 nanometres (nm), 0.1-50 milliseconds (ms) resolution in time and capable of determining thermal uncertainties of a few milli Kelvin (mK), (ii) thermo-reflectance with a typical spatial resolution of around 500 nm, approximately 100 nanoseconds (ns) resolution in time and suited for measurement of temperature changes of around 100 mK, or (iii) Raman scattering with a typical spatial resolution of around 500 nm, approximately 200 nanoseconds (ns) resolution in time and capable of determining thermal uncertainties of around 100 mK. These different approaches come with a variety of disadvantages such as the need for vacuum during measurement, non-quantitative measurements, crosstalk between measurement device and the topography of the sample affecting the result of the measurement, a limited dynamical temperature range and experimental complexity, to name a few.

The sensitivity range of SThM depends essentially on the probe type and on the thermal conductivity of the measured sample material, in particular if said material has a high thermal conductivity such as encountered in metals.

Thermoreflectance is a very accurate method for determining relative temperatures, i.e. temperature differences, but less suited to determine the actual absolute temperature of a measured sample point.

In Raman spectroscopy spatial resolution is limited by diffraction, which in turn depends on the wavelength of the illuminating light. The resolution is therefore typically limited to the 500 nm range.

In recent years, nanoscale thermometry based on colour centres in wide-bandgap semiconductors, in particular Nitrogen-Vacancy (NV) centre electronic spins in diamond, have been investigated as an alternative which could potentially overcome these limitations. Diamond-based colour centre thermometry provides a significant advantage over conventional thermometry methods as it allows for sensitive and quantitative temperature measurements and over a wide temperature range, notably from around 100 K to about 600 K, in the nanometre resolution range. As a further advantage, diamonds are chemically inert and non-toxic, permitting for their application in biological systems and chemical reactions.

Monocrystalline synthetic diamonds, and isotopically enriched diamonds in particular, are known to have the highest thermal conductivity of any known solid at room temperature. Due to their exceptionally high thermal conductivity ranging from 1 to over 3 kW/(m*K) and their low thermal capacity, diamonds are suited to measure temperatures of almost any sample material, including highly thermo-conductive metals. This is a significant advantage over silicon-based sensing probes commonly used in SThM, which are neither suited to measure metal material nor single-crystal semiconductors, as the probe thermal conductivity has a value that is comparable or even inferior to the thermal conductivity of the target sample material.

To date, several approaches have been disclosed, which benefit from the advantages of diamond-based colour centre thermometry.

Document WO2014051886 discloses a diamond sensing probe with an outcoupling structure, which is a diamond nanopillar, and colour centres which are located within less than 40 nm from the sensing surface of the sensing probe.

Document US20160018269 discloses a method utilizing NV colour centres in diamond for nanoscale thermometry down to mK temperature uncertainty, which is suited to measure heat-generating intracellular processes.

The above cited documents employ single diamond nanocrystals, or a pillar-shaped diamond nanostructure as sensors.

Document EP3376245 discloses a sensor device based on a microscale probe having a spin defect. The sensor device further comprises a microwave antenna which is arranged at a distance of less than 500 micrometres from the spin defect. The embodiments shown in EP3376245 primarily concern application in magnetometry.

Due to their extremely high thermal conductivity, larger diamond thermal probes are not considered suitable for nanoscale thermometry, as their greater volume would drastically increase thermal conduction. An approach employing single diamond sensing probes at cubic micrometre ($\mu m^3$) scale has not been pursued thus far. At microscale volume a diamond's thermal conduction would rapidly equilibrate the temperature within a scanning probe resulting in poor spatial resolution given the typical tip shapes consisting of cylinders with flat end-surfaces of around 200 nm in diameter. Moreover, a larger single diamond probe would act as a powerful heat-sink and therefore quantitative assessment of the temperature would be prohibitive.

Single-crystal diamond sensor probes at the microscale provide considerable advantages, such as their capacity to measure highly conductive sample material like metals with high sensitivity, their robustness and their readily scalable production. However, in order to benefit from these advantages, the significant problem of heat dissipation resulting from the larger volume of the single diamond has to be overcome. None of the approaches and technologies known today, offer a satisfying solution to this problem.

SHORT DISCLOSURE OF THE INVENTION

An aim of the present invention is the provision of a robust single diamond sensor probe at microscale volume, which is capable of achieving high thermal sensitivity, at nanometre spatial resolution, over a wide temperature range.

It is a further aim of the invention to provide a single diamond thermal sensor probe with a microscale volume, that offers a solution to the problem of excessive heat dissipation and overcomes the shortcomings and limitations of the prior art.

As used herein, microscale volume may indicate a volume comprised between $10^{-3}$ $\mu m^3$ and 20 $\mu m^3$, for example between $10^{-3}$ $\mu m^3$ and 1 $\mu m^3$. Realizations with larger volumes, for example between 1 μm³ and 10 μm³ or up to 20 μm³ are also possible and may be advantageous in certain cases.

In particular, the invention aims to provide a method to reliably measure temperatures of highly thermally conductive materials, such as metals, at spatial resolution in the nanometre range.

According to the invention, these aims are attained by the object of the attached claims, and especially by claim 1, disclosing, amongst other essential features, a pointed sensing tip, which is part of a microscale single diamond sensing probe, and a thermal isolation barrier.

The thermal isolation barrier is be positioned to thermally decouple the diamond sensor probe from the detector system. It may form part of the scanning probe, of the diamond holding structure, or of the mounting structure. It may also be an area of connection between said parts.

The thermal isolation barrier is configured to reduce or prevent heat diffusion to the detection system, thus minimising temperature exchange between the sample heat source and the detection system. The 15 single diamond probe is thermally decoupled from its environment, limiting its effect as a heat sink. An equilibration between the temperature of the sample heat source and the thermal measuring system is therefore avoided. Due to said thermal isolation, temperature measurements are minimally invasive, as only a minimal amount of heat is extracted from the sample. Said thermal isolation also results in maximally quantitative measurements.

The single diamond probe features a sharp sensing tip of a curvature radius R which may be between 400 nm and 100 nm, or, preferably, less than 100 nm, ideally between 10 nm and 1 nm for high spatial resolution applications. The sensing probe is therefore equipped to measure at a spatial resolution of less than 100 nm, preferably less than 10 nm, ideally at about 1 nm.

Based on its microscale volume and its favourable shape, as disclosed in claim 1 and further described in claim 8, the diamond sensing probe features better robustness when compared to the state of the art. Due to its larger size and geometry, the need for a fragile nano-pin or nano-column sensing tip structure, as used in the state of the art, is overcome.

Advantageously, the microscale sensing probe including its sensing tip is made from a single diamond crystal, providing a direct and unobstructed thermal connection between the sensing tip and light emitting colour centres, which are located within the microscale probe. The probe benefits from the high thermal conductivity and low thermal capacity of the diamond material, providing an efficient thermal link between sensing tip the temperature sensor, i.e. the colour centres. This arrangement enables measurements with excellent thermal sensitivity.

In addition, the greater volume of the single diamond sensor probe allows for an increased light collection efficiency from the sensing colour centres and a larger number of colour centres both of which allow for the detection of even smaller temperature differences therefor improving temperature sensitivity.

Advantageously, the microscale sensing probe comprises a plurality of colour centres, wherein the intensity of their temperature-dependent fluorescence is enhanced proportionally to their number. The sensitivity of the probe scales with $1/(N)^{1/2}$, whereby N is the number of NV centres contributing to the signal. In short, a higher number of colour centres enhances the temperature-specific light signal of a sample temperature transmitted by the sensing probe.

As a further advantage, the multiple colour centres may be located in a defined zone at a distance from the sensing tip, whereby the density of the colour centres in said zone further improves sensitivity information, in particular thermal uncertainty. A narrow width of said zone also reduces uncertainty resulting from the thermal gradient across the scanning probe.

The overall favourable geometry of the sensing probe, which is preferably of conical or pyramidal shape and is capable of optically guiding light towards an output window. Said optical guidance enhances the collection efficiency and increases the number of photons being emitted towards the collection optics. This serves to improve thermal sensitivity.

Diamonds are known to be extremely thermoresistant, capable of performing at temperatures ranging from about 100 K to about 600 K, providing the sensor probe with a very wide operational temperature range.

Based on the inherent chemical inertness of diamond material, the sensor probe is also robust to changes in the local chemical environment, which is of particular interest in the study of nanoscale chemical reactions. Due to the non-toxicity of diamond material the thermal detection system is furthermore suited for thermal analysis of biological systems.

Advantageously, the diamond sensing probe is positioned in close proximity to the sample heat source by a mounting system, which is connected to the sensor probe through the thermal isolation barrier. To enable efficient quantitative thermal sensing the sensor tip is positioned in such a way, that it touches or is in close proximity, i.e. less than 10 nm, from the surface of the sample heat source.

Furthermore, for the determination of proximity between and/or contact of the sensing tip and the surface of the sample heat source the diamond holding structure can, according to commonly known methods, be employed in contact mode, non-contact mode or in tapping mode depending on the nature of the sample heat source. In this way, the position of the sensor tip can be adjusted to the topography and the type of the surface to be measured. An undesirable variation of distances between sensor tip and said sample surface during measurements can therefore be avoided. This controlled positioning also prevents damages to either the sample heat source or the sensing probe as a result of imprecise manoeuvring of the sensor probe.

With respect to what is known in the art, the invention provides the advantages of combining outstanding robustness with unmet thermal sensitivity at ambient temperatures and excellent spatial resolution. In addition, the disclosed diamond sensor probe is capable to quantitatively measure high thermal conductivity sample materials such as metals. These advantages are achieved by combining the excellent temperature sensitivity of NV spin centres with the exceedingly high thermal conductivity of a microscale single crystal diamond, which is thermally decoupled from the detector system.

SHORT DESCRIPTION OF THE DRAWINGS

Exemplar embodiments of the invention are disclosed in the description and illustrated by the drawings in which:

FIGS. 1A and 1B illustrate schematically view the scanning sensor probe 1, in which FIG. 1A illustrates the scanning sensor probe 1 connected to a mounting structure 6

(B) FIG. 2A is a detailed view of the scanning sensor tip 2.

FIGS. 2A-2C illustrate schematically possible locations of sensor colour centres 5 in the scanning sensor probe 1, in which FIG. 2A illustrates an ensemble of colour centres 5 located at a distance from the sensor tip 2, FIG. 2B illustrates colour centres 5 distributed over the entire volume of the sensor probe 1, FIG. 2C illustrates one or more colour centres 5 located in the sensor tip 1.

Figure 1A:
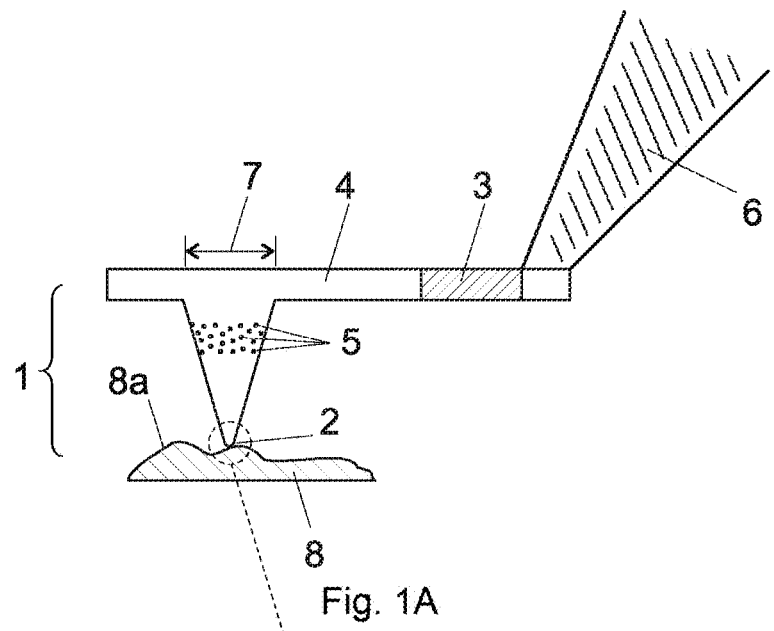
Figure 1B:
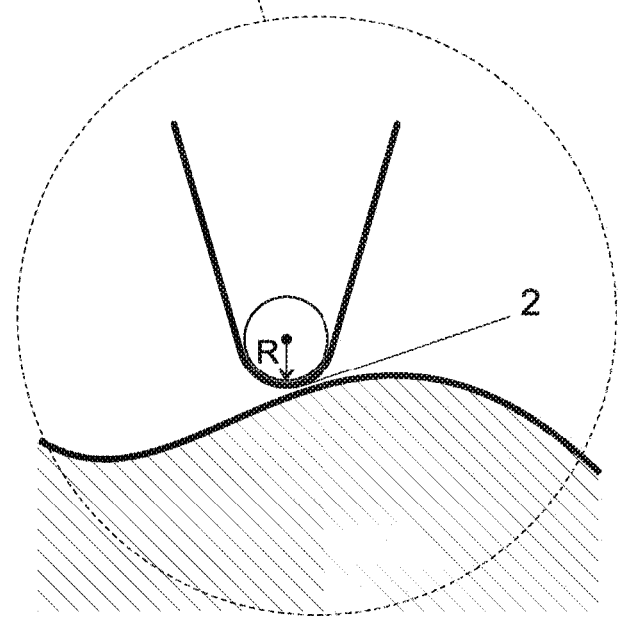

With reference to FIGS. 1A and 1B, the schematic illustration of this preferred embodiment depicts the nanoscale temperature detector's essential elements, including a scanning sensing probe 1, which is preferably a monocrystalline diamond probe with microscale volume, featuring a sharp apex, which serves as the scanning sensor tip 2, a plurality of sensor colour centres 5 located in the scanning probe 1, a mounting system 6 and a thermal isolation barrier 3 decoupling said sensing probe 1 from a detector system. In a preferred embodiment, the temperature detector furthermore comprises a diamond holding structure 4, which is preferably part of the of the same diamond monocrystal forming the scanning sensor probe 1. The diamond holding structure 4 essentially serves as a connection to the mounting structure 6.

With respect to the sample heat source, the scanning sensor can be positioned in contact, non-contact or in tapping mode. The sample heat source is presented on a sample stage 12. Positioning of the scanning sensor is preferably, by employing a quartz tuning fork method according to known methods, wherein diamond to-to-sample distance is based on the piezoelectric effect and achieved with sub-nanometre precision.

Alternatively, the diamond holding structure may be employed to control positioning in analogy to known positioning methods relying on cantilevers.

In order to achieve the desired spatial resolution of below 100 nm, below 10 nm, or below 1 nm the curvature radius R of the scanning sensor tip 2 is less than 100 nm, or less than 10 nm, or less than 1 nm.

Figure 2A:
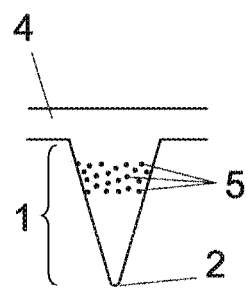
Figure 2B:
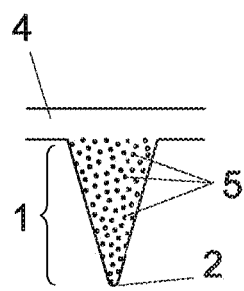
Figure 2C:
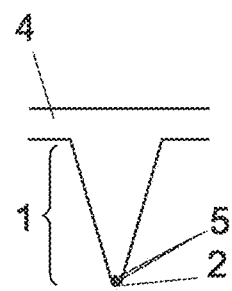

The surface temperature of a sample heat source 8 is sensed by means of optically excited colour centres 5 which are located within the sensing probe 1. An ensemble of said colour centres 5 can be distributed over the entire volume of the sensing probe, located in close proximity to the apex of the sensing probe, as shown in FIGS. 2 B and 2 C respectively, or, in a preferred embodiment, located at a separation distance from the sensor tip 2 of the scanning probe 1, as shown in FIG. 2A. Such separation distance ranges from 0 nm to 1 µm.

In a preferred embodiment said sensor colour centres 5 are nitrogen vacancy (NV) point defects in the diamond lattice. One property of said NV centres is photoluminescence. NV centres can be optically excited by visible light, in particular a yellow-green laser light or an LED light with wavelength below 575 nm, typically with wavelength of 515 nm or 532 nm. Such light is emitted by an optical excitation source 9a, which forms part of the detector system. Upon relaxation, said excited NV centres 5 emit red fluorescence light which can be detected by an optical detector 9b comprised in the detector system 13. Furthermore, the NV centres spin sub-levels can be manipulated using microwave fields emitted from a nearby antenna that impacts the number of photons emitted by said NV centres when in resonance with said spin sub-levels, constituting an optically detected magnetic resonance (ODMR) spectrum. Importantly, the ODMR spectra of these NV centres show temperature-sensitive features, in particular a temperature-dependent zero-field splitting enabling fluorescence-based thermometry.

The temperature-sensitive NV centres 5 are directly linked to the sensor tip 2 through the single-crystal diamond material of the sensor probe 1. Said diamond link ensures a rapid thermal conduction from the tip 2 to the sensor NV centres 5. The sensor probe comprises up to 100 ppm colour centres, wherein ppm, or "parts per million", refers to the ratio between the NV centers and the number of carbon atoms in the diamond lattice. Typically, a sensor probe 1 of an approximate volume of $10^{-3}$ µm$^3$ to 1 µm$^3$ comprises up to 3000 sensor NV centres 5.

The sensor probe is capable of self-calibrated temperature measurements. This is due to the fact, that the zero field splitting DO of the NV centre electron spin resonance line has a well-known temperature dependence, which is identical for all NV centres and does not require calibration. In particular, DO 2.87 GHz at room temperature, where dDO/dT~−78 kHz/K. Further disturbances such as electric and/or magnetic fields, strain, etc. can affect DO. However, since these effects are well understood, their impact can be separated from the measured temperature changes.

The microscale diamond sensor probe 1 has a geometrical shape which is suited to guide the light emitted by the colours centres 5, preferably towards the optical window 7. Said geometrical shape comprises at a minimum a transverse dimension of at least 200 nm and a sharp apex, which constitutes the sensor tip 2.

In one embodiment, said geometrical shape is a cone, a pyramid, or a suitable diverging shape. Said conical, pyramidal or similar shape may have a minimal transversal dimension of between 200 nm and 500 nm, and a sidewall inclination angle between 1° and 45°, preferably between 5° and 30°. Optionally, the shapes may be truncated. Said preferred shapes widen from the sensor tip 2 to the optical window 7, and this widening is suited to reinforce thermal conduction.

In an alternative embodiment the sensor tip 2 has a parabolic shape. The shape may also be locally parabolic, for example near the tip.

In terms of its thermal sensitivity, the microscale volume sensor probe 1 is superior to the diamond-based thermal sensors known in the state of the art. At room temperature the sensor described in this invention is capable of attaining thermal sensitivity values in the low K/(Hz)$^{1/2}$ to mK/(Hz)$^{1/2}$ range. At present, the most sensitive single NV centre-based diamond thermal probes can reach sensitivities of approximately 65 mK/Hz$^{1/2}$ under the same temperature conditions.

Figure 4:
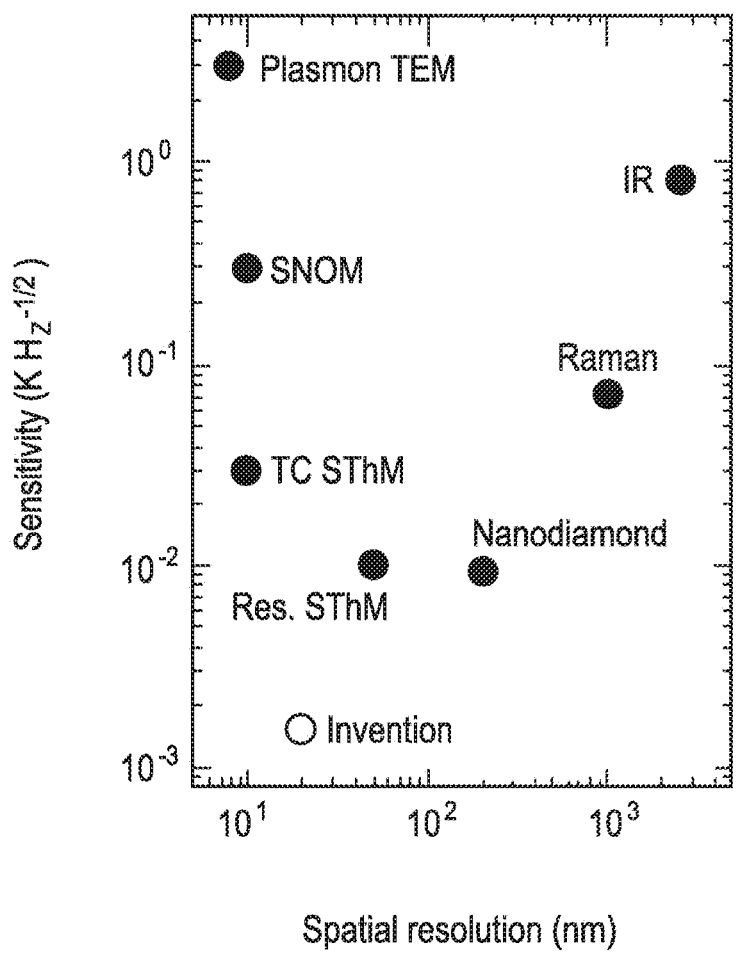
FIG. 4 is a performance overview of available nanoscale thermal imaging devices at room temperature. Figure adapted from Halbertal et al., *Nanoscale thermal imaging of dissipation in quantum systems*, Nature 539, 407.

As seen from the graphical presentation of FIG. 4 which plots spatial resolution over thermal sensitivity, the microscale sensor probe 1 compares extremely favourably with currently available thermal and spatial high-resolution technology, as it combines a DC thermal sensitivity at room temperature in the low mK/Hz$^{1/2}$ range with values of less than 70 mK/Hz$^{1/2}$, ideally less than 10 mK/Hz$^{1/2}$, with a spatial resolution of 100 nm and below.

The thermal isolation barrier 3 serves to thermally decouple the scanning probe 2 from the detector system. The thermal isolation barrier 3 may form part of the scanning probe 1 monocrystal, whereby it constitutes a defined section of structural features impeding thermal conductivity of the diamond.

Alternatively, the thermal barrier 3 may form part of the diamond coupling structure 4.

In an alternative embodiment the thermal barrier 3 may form part of the mounting structure 6.

The thermal barrier 3 may be provided by structural features, it may be a porous structure, for example resulting from etched holes, a grid structure, a phononic structure, an isotopically modulated diamond structure, or other structural amendments, which reduce thermal conduction through the thermal isolation barrier 3 section.

Alternatively, the thermal isolation barrier 3 may consist of a different material, which connects the scanning probe with the mounting structure but prevents conduction of heat. Such material may be a low-density material such as a porous polymer, ceramics other porous material.

It may also be any other material which blocks conduction and is sufficiently strong to serve as connector section between scanning sensor probe 1 and the mounting structure 6.

The thermal isolation barrier 3 may furthermore consist of diamond material with varying isotopic concentrations, quartz, a polymer, a curable resin, or an adhesive.

Due to its larger micrometre size and its preferred simple shape, production of the diamond sensor probe 1 is readily scalable. The sensing probes can be produced by a series of lithography and dry etching (commonly known as "plasma etching") steps to shape the diamond crystal in the desired shape, produce the sensor probe containing NV centres and release the shape from the diamond host.

Figure 3:
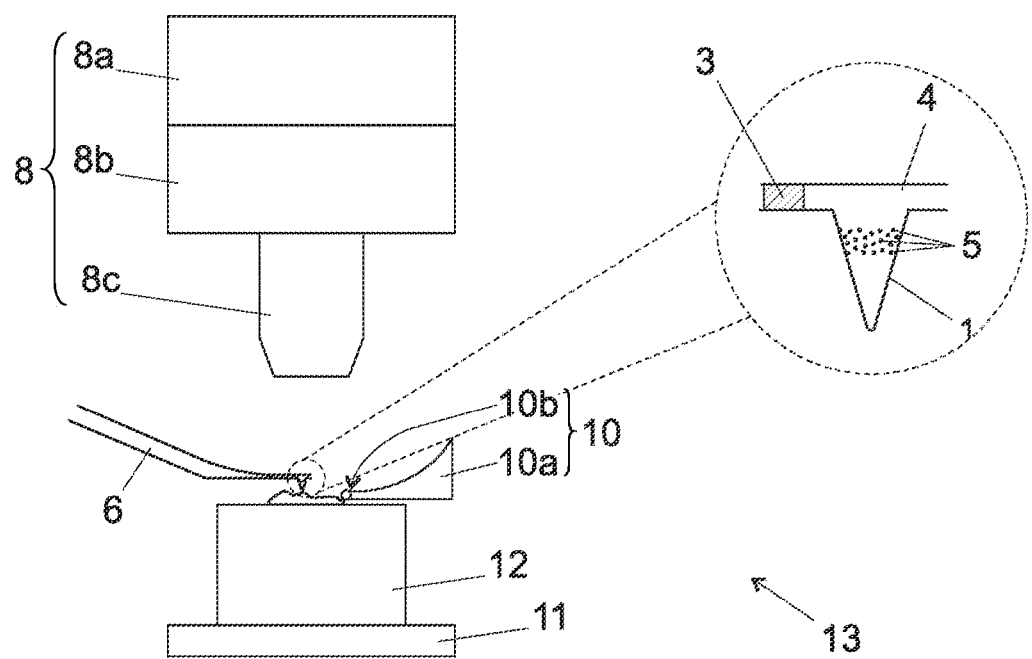
FIG. 3 is a schematic presentation of the overall thermometry system.

In a preferred embodiment the thermal sensing probe 1 is connected to the detector system 13, as is shown in FIG. 3. Said detector system comprises the optical excitation source 9a, a microwave source 10, the mounting structure 6, which optionally comprises the microwave source 10, and the optical detector 9b. Both optical excitation 9a and detector 9b are part of a confocal microscope 9 with an objective lens 9c. The microwave source comprises a microwave delivery system 10a and a microwave antenna 10b. Preferably, the system furthermore comprises a sample stage 12 and a sample course positioning structure 11.

The optical excitations source 9a is configured to excite the colour centres 5. In a preferred embodiment the optical excitation source 9a is a blue or green laser light or an LED light below 575 nm, typically green laser light at 532 nm, suited to excite the electron spins of the sensor NV colour centres 5 from their ground state to their excited state.

The microwave 10 is configured to direct continuous or pulsed wave microwave radiation to the colour centres, which changes the spin population of the sublevels within the ground and excited state. The microwave frequency is swept to detect spin resonance frequencies, generating an ODMR spectrum.

A course positioning structure 11 to change the relative position between tip and sample can be used to localize the region of interest of the sample heat source 8. The sample or tip stage 12 is then used to scan the scanning sensor probe 1 with respect to the sample heat source 8. The mode of movement of the sample course positioning 11 and sample stage 12 can be manual but is preferably automated when the system is in measuring mode. During measurements the sensor tip remains static with respect to the optical detection path to ensure the alignment between the optical excitation source 9a, the optical detection source 9b, the objective lens 9c and the scanning sensor probe 1.

In one embodiment the mounting structure 6 is fixed and the objective lens 9c is movable.

In an alternative embodiment the mounting structure 6 is movable and the objective lens 9c is fixed.

In one embodiment the microwave source 10 applies a plurality of microwave pulses to the colour centres.

In an alternative embodiment the microwave source 10 applies a continuous microwave to the colour centres.

The optical detector 9b is capable of detecting and quantifying the light emitted by the sensor colour centres 5. For a NV centre-based probe 1, the optical detector 9b must optimally be capable of measuring emission wavelengths ranging from 600 nm to 800 nm. In a preferred embodiment said optical excitation source 9a, the optical detector 9b and the objective lens 9c constitutes a confocal microscope 9 integrated in a scanning atomic force microscope (AFM).

The nanoscale temperature detector and detector system claimed in this invention can be employed in a method to determine and/or map the surface temperature of a sample heat source 8. Said method comprises several steps, including movably positioning the sensor tip 2 in proximity of or in contact with the surface of a heat source 8a, applying one or more optical pulse generated by the optical excitation source 9 to the colour centres 5 to polarize the ground electronic spin state, applying either a plurality of microwave pulses or a continuous microwave to the colour centres 5 of the sensing probe 1 to alter the spin population, measuring the spin-state-dependent fluorescence rate of the colour centres 5, determining the temperature of the heat-source based on the measured spin-state-dependent emission count rate.

The invention claimed is:

1. A nanoscale temperature detector comprising
a diamond sensing probe with a sensing tip having a curvature radius (R) of less than 100 nanometres, or less than 10 nanometres, or less than 1 nanometre, and comprising up to 100 ppm colour centres, whose emission count rate show temperature-sensitive features,
wherein the diamond sensing probe is configured to optically guide a light emitted by the colour centres,
wherein the diamond sensing probe has a transverse dimension of at least 200 nanometres, the nanoscale temperature detector further comprising
a mounting structure connectable to a detector system, and
a thermal isolation barrier thermally decoupling the sensing probe from said detector system.

2. The nanoscale temperature detector of claim 1, whereby the plurality of colour centres are NV (nitrogen-vacancy) defects whose electron spin resonance spectra show temperature-sensitive features.

3. The nanoscale temperature detector of claim 1, wherein the colour centres are distributed across the sensing probe.

4. The nanoscale temperature detector of claim 1, wherein the colour centres are localised in a region with a separation distance from the tip no more than 1 micrometre.

5. The nanoscale temperature detector of claim 1, wherein the sensing probe is connected to a diamond holding structure.

6. The nanoscale temperature detector of claim 1, wherein the sensing probe is formed of a single crystal diamond material.

7. The nanoscale temperature detector of claim 5, wherein the sensing probe and said diamond holding structure are formed of a single crystal diamond material.

8. The nanoscale temperature detector of claim 1, wherein the shape of the sensing probe features a conical or pyramidal shape with a sharp apex, and a sidewall inclination angle between 0° and 45°.

9. The nanoscale temperature detector of claim 7, wherein the shape of the sensing probe features a conical or pyramidal shape with a sharp apex and a sidewall inclination angle between 0° and 45°.

10. The nanoscale temperature detector of claim 5, wherein the thermal isolation barrier consists of the same single crystal diamond material as the diamond holding structure featuring structural impediments to thermal conduction, such as a decreased thickness or decreased width, or a phononic structure, or an isotopically modulated diamond structure, or a porous structure, or a grid structure, or other suitable changes in structure.

11. The nanoscale temperature detector of claim 1, wherein the thermal isolation barrier consists of a material with low thermal conductivity, such as quartz or a low-density material.

12. A method of manufacturing the nanoscale temperature detector according to claim 1, comprising a series of lithography and dry etching, commonly known as "plasma etching", steps to shape the diamond crystal in the desired shape, produce the sensor probe containing NV centres and release the shape from the diamond host.

13. A detector system comprising a nanoscale temperature detector of claim 1, further comprising
- an optical excitation source configured to excite the colour centres
- a microwave source configured to direct microwaves towards the colour centres
- the mounting structure to positioning the sensing probe in relation to a heat source sample
- an optical detector capable of measuring the light emitted by the colour centres.

14. A detector system according to claim 13, wherein the optical excitation source is a laser or an LED tuneable to a wavelength less than 575 nm, typically a wavelength of 515 nm or 532 nm.

15. A detector system according to claim 13, wherein the optical detector is a confocal microscope 9 integrated in a scanning atomic force microscope (AFM).

16. A method employing the detector system according to claim 13 comprising:
- movably positioning the sensor tip in proximity of or in contact with the surface of a heat source,
- applying one or more optical pulse generated by the optical excitation source to the colour centres to polarize the ground electronic spin state,
- applying continuously or a plurality of microwave pulses to the colour centres of the sensing probe to alter the spin population,
- measuring the spin-state-dependent fluorescence rate of the colour centres,
- determining the temperature of the heat-source based on the measured spin-state-dependent emission photon count rate.

17. The nanoscale temperature detector of claim 1, whereby the plurality of colour centres are NV (nitrogen-vacancy) defects whose electron spin resonance spectra show a temperature-dependent zero-field splitting of its ground electronic spin state.

18. The nanoscale temperature detector of claim 1, wherein the shape of the sensing probe features a conical or pyramidal shape with a maximum transversal dimension between 200 nanometres and 500 nanometres, and a sidewall inclination angle between 5° and 30°.

19. The nanoscale temperature detector of claim 7, wherein the shape of the sensing probe features a conical or pyramidal shape with a maximum transversal dimension between 200 nanometres and 500 nanometres, and a sidewall inclination angle between 5° and 30°.

* * * * *